United States Patent [19]

Arnold

[11] 4,370,846
[45] Feb. 1, 1983

[54] GANG MOWER WITH SINGLE CYLINDER LIFTING MECHANISM

[75] Inventor: William T. Arnold, Sutton West, Canada

[73] Assignee: Brouwer Turf Equipment Limited, Keswick, Canada

[21] Appl. No.: 274,905

[22] Filed: Jun. 18, 1981

[30] Foreign Application Priority Data

Oct. 17, 1980 [CA] Canada ............................. 362692

[51] Int. Cl.³ ............................................. A01D 75/30
[52] U.S. Cl. ............................................. 56/6; 56/16.2
[58] Field of Search .................... 56/7, 6, 14.9, 15.9, 56/16.2

[56] References Cited

U.S. PATENT DOCUMENTS

| | | | |
|---|---|---|---|
| 2,104,719 | 1/1938 | Pol et al. | 56/7 |
| 2,764,864 | 10/1956 | Kinkead | 56/7 |
| 3,832,835 | 9/1974 | Hall et al. | 56/7 |
| 4,135,349 | 1/1979 | Schwertner | 56/6 |
| 4,161,858 | 7/1979 | Gerrits | 56/7 |
| 4,330,981 | 5/1982 | Hall et al. | 56/7 |

FOREIGN PATENT DOCUMENTS

1245091 9/1971 United Kingdom .................... 56/7

Primary Examiner—Paul J. Hirsch
Assistant Examiner—David L. Tarnoff
Attorney, Agent, or Firm—Rogers, Bereskin & Parr

[57] ABSTRACT

A gang mower typically having five or seven gangs which are raised and lowered by a single piston and cylinder. Lifting arms are fixed to an actuating shaft at each side of the machine and the piston and cylinder are connected between opposed lifting arms to rotate them in opposite directions. An equalizer link connected by cranks to the actuating shafts ensures that the shafts always rotate to equal extents in opposite directions. Chains are connected from the lifting arms to the mowers, the chains and lifting arms being dimensioned so that lifting occurs sequentially, with some of the mowers being lifted before others. The sequential lifting spreads the load more evenly throughout the lifting sequence, thereby permitting a single piston and cylinder to lift all of the mowers.

20 Claims, 10 Drawing Figures

GANG MOWER WITH SINGLE CYLINDER LIFTING MECHANISM

This invention relates to a power-driven gang mower, in which a number of individual mowers are mounted on and powered from a main frame.

Power-driven gang mowers may include a main frame which is supported on its own wheels and which is pulled by a tractor. A number of individual mowers are normally connected to the frame and are driven by a drive mechanism which is mounted on the frame and which is in turn driven from the tractor. The mowers are lowered when in use, but when they are not in use, they normally must be lifted so that the gang mower can be driven along roads and through narrow openings such as gates, and so that the mowers will not be damaged by stones and the like. Examples of gang mowers in which the mowers may be lifted are shown in U.S. Pat. Nos. 2,104,719 and 2,764,864, and in U.S. Pat. No. 4,161,858 assigned to the assignee of this application.

In the past, the operator of a gang mower has commonly had to lift mowers manually. This has been a difficult and time-consuming procedure. Therefore attempts have been made to construct gang mowers with power-lifting devices. However so far as is known, such prior attempts have required separate lifting cylinders for each pair of mowers and have been constructed so that lifting of the mowers on each side of the unit is uneven. Such prior attempts have not so far as is known been widely accepted.

It is therefore an object of the present invention in one aspect to provide an improved gang mower in which a single piston and cylinder provide more even lifting of the mowers on each side of the gang mower. To this end, an equalizer link is connected between the lifting mechanism on each side of the gang mower and ensures that a mower on one side of the unit is lifted to the same extent as a mower on the other side. Where more than three mowers are to be lifted, and preferably even when there are only three mowers on the gang mower, lifting occurs sequentially, i.e. lifting of some of the mowers commences before lifting of other mowers. The sequential lifting reduces the load on the piston and cylinder. This enables use of a single cylinder of moderate size, to lift (in a typical embodiment of the invention) five or seven mowers, therefore substantially reducing the cost and complexity of the gang mower and also reducing the maintenance needed.

Further objects and advantages of the invention will appear from the following description, taken together with the accompanying drawings, in which.

Figure 1:
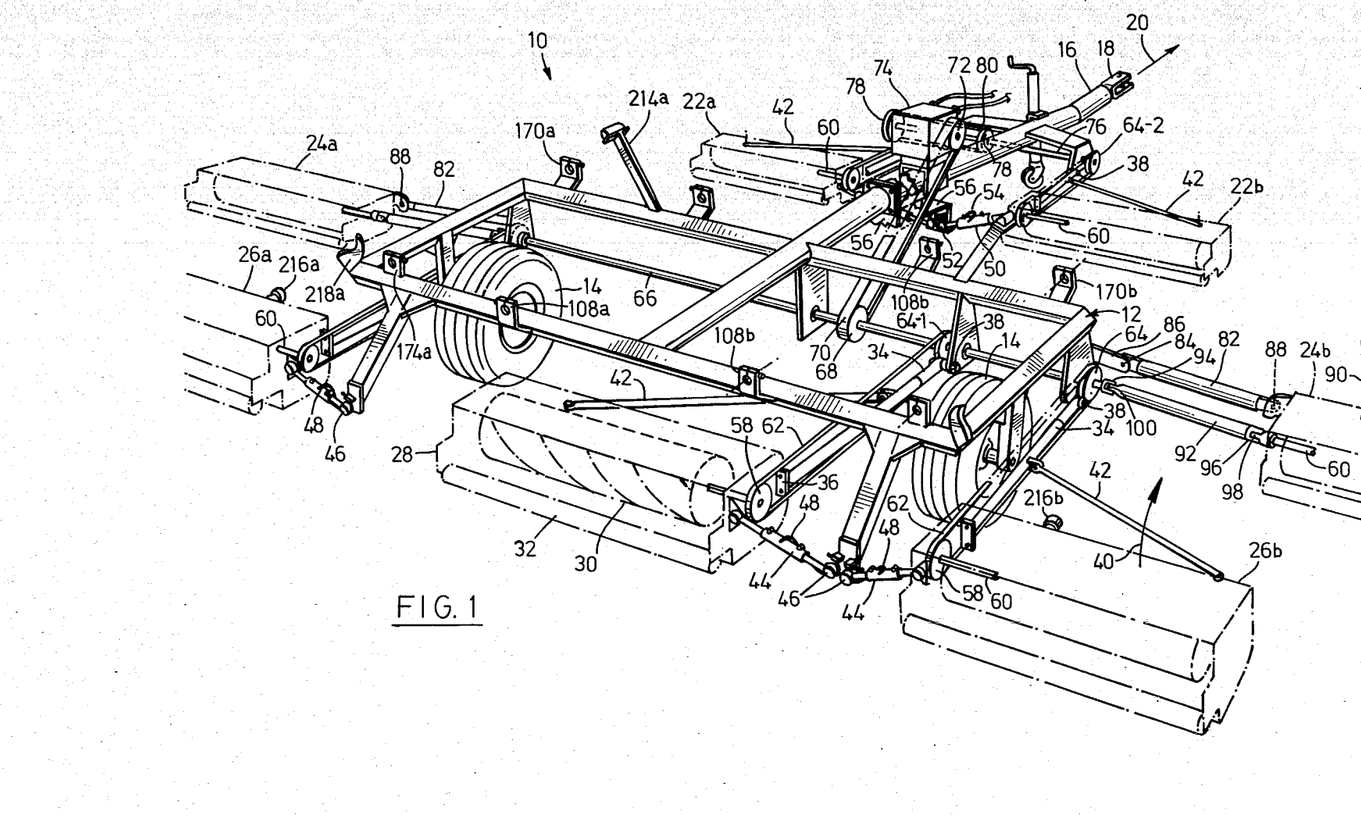
FIG. 1 is a perspective diagrammatic view showing the overall arrangement of a typical gang mower in which a lifting mechanism according to the invention is incorporated, but omitting for clarity most of the lifting mechanism.

Reference is first made to FIG. 1, which shows the general organization of a standard seven-unit gang mower 10, without any power lifting equipment. The gang mower shown is similar to that shown in U.S. Pat. No. 4,161,858 (except that the FIG. 1 gang mower has seven mower units instead of the five shown in that patent). The gang mower of FIG. 1 includes a main frame generally indicated at 12, supported by wheels 14. The main frame 12 has a drawbar 16 having a front hitch 18 which is adapted to be connected to a tractor (not shown) which propels the gang mower along a path of travel indicated by arrow 20.

Supported on the main frame 12 are seven individual identical mowers, namely a pair of front mowers 22a, 22b, a pair of outer-side mowers 24a, 24b, a pair of rear-side mowers 26a, 26b, and a rear-centre mower 28. Each mower is of conventional construction, as shown in U.S. Pat. No. 4,161,858 and includes a cutting reel 30 which is power driven within the mower unit frame to rotate against a bed knife (not shown) to cut grass. The rear of each mower is supported by a conventional roller 32. In FIG. 1 the front mowers 22a, 22b are shown slightly forward of their normal position, for clarity, the drawbar 16 being broken away for this purpose.

The front mowers 22a, 22b, the rear-side mowers 26a, 26b, and the rear-centre mower unit 28, are all mounted in the manner shown in U.S. Pat. No. 4,161,858 and such mounting will be described only briefly.

Specifically, each of these mowers includes a telescopic mounting arm 34 fixed at its rear 36 to the front of the mower and pivotally connected at a front pivot bolt 38 to the main frame 12 of the gang mower. Thus the entire telescopic arm 34 and mower can pivot as indicated by arrow 40 about the front pivot 38 and can also rotate about the axis of arm 34 due to the telescopic construction of the shaft. A strut 42 connected between the outer end of each mower and the centre of the telescopic arm 34 assists in guiding each mower and reduces lateral bending forces in the telescopic arm 34.

The rear of each of the rear mowers 26a, 26b and 28 is held to the main frame by a tie rod 44 having spherical bearings 46 at each end to permit movement in an upward and downward arc and also in a forward and backward arc. A spring 48, as in U.S. Pat. No. 4,161,858, provides downward pressure on the inner ends of the rear mowers to counteract the lifting forces on the mower-inner ends produced by the mower-drive belts (to be described). Identical tie rods 50 having spherical bearings 52 at each end with springs 54 are used to tie the rear ends of the front mowers 22a, 22b to a strut 56 extending downwardly from the drawbar 16.

Power is supplied to the reels of the rear and front mowers in the same manner as described in U.S. Pat. No. 4,161,858. Specifically, a pulley 58 is connected to each reel shaft 60 and is driven by a belt 62 which extends over the telescopic arm 34 to a pulley 64 mounted immediately ahead of the front end of the telescopic arm 34. The pulleys 64 for the rear-side mowers 26a, 26b and the pulley 64-1 for the rear-centre mower 28 are all mounted on a shaft 66 extending laterally across the main frame 12. The shaft 66 is driven by a pulley 68 and belt 70 driven by another pulley 72 mounted on a gear box 74. The gear box 74 is operated from the power take-off shaft (not shown) of the tractor which pulls the gang mower 10.

The front pulleys 64-2 of the front mowers 22a, 22b are mounted on a separate shaft 76 also driven by pulleys 78 and a belt 80 from the hydraulic motor 74.

The outer-side mowers 24a, 24b are supported and guided by their lifting arms (not shown in FIG. 1 and to be described) and by a front tie rod 82. The front tie rod 82 is pivotally connected at 84 to a lateral projection 86 from the main frame 12, and is pivotally connected at 88 to the inner front portion of each outer-side mower 24a, 24b. The pivotal connections 84, 88 permit the outer-side mower units 24a, 24b to be lifted upwardly in the direction of arrow 90, as will be described.

The outer-side mowers 24a, 24b are powered by shaft extensions 92. The inner end of each shaft extension 92 is connected by a universal joint 94 to the cross-drive shaft 66, and the outer end of each shaft extension 92 is connected by another universal joint 96 to the reel shaft 60 of the mowers 24a, 24b. The pivots 98 of the outer universal joint 96 are aligned with outer pivots 88 of the tie rod 82, and the pivots 100 of the inner universal joint 94 are aligned with the inner pivots 84 of the tie rods 82, to permit folding of mowers 24a, 24b. Shear pins (not shown) are located in the shaft 66, one between each side of pulley 68 and the universal joints 94, 96, so that if the drive system is engaged accidentally while the outer-side mowers, 24a, 24b are lifted, shafts extensions 92 and mowers 24a, 24b will not be destroyed.

Figure 2:
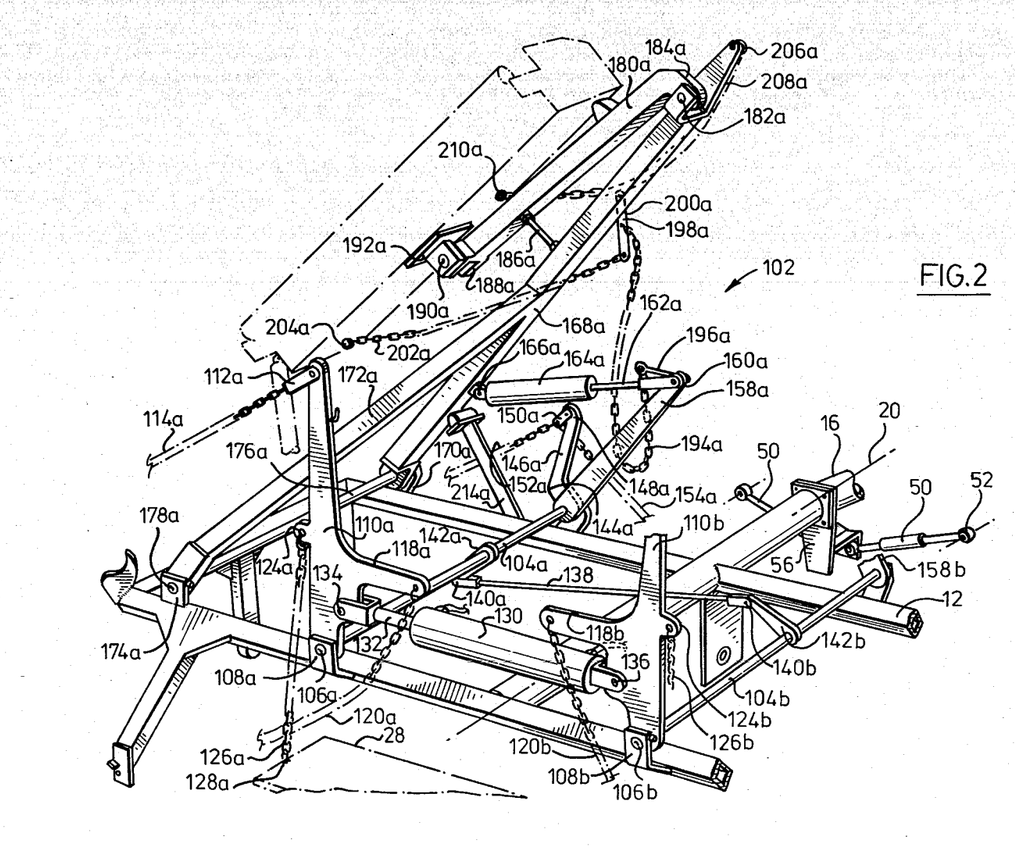
FIG. 2 is a perspective view of a portion of the gang mower of FIG. 1, showing lifting mechanism for one side of the gang mower and showing a portion of the lifting mechanism for the other side of the gang mower.

Reference is next made to FIG. 2, which shows in perspective half of the lifting mechanism used in the FIG. 1 gang mower. The reamining half of the lifting mechanism, of which only a portion is shown, is a mirror image of the lifting mechanism shown. The left and right sides of the lifting mechanism will be indicated by the subscripts "a" and "b" respectively. The description will focus on the left half of the lifting mechanism since the two halves are mirror images.

The lifting mechanism, generally indicated at 102, includes a pair of actuating shafts 104a, 104b rotatably journalled in bushings 106a 106b mounted in stub supports 108a, 108b welded to the main frame 12. The shafts 104a, 104b are spaced apart laterally, one being adjacent each side of the main frame 12. As shown, the actuating shafts 104a, 104b extend in a direction parallel to the path of travel 20 of the gang mower.

Figure 3:
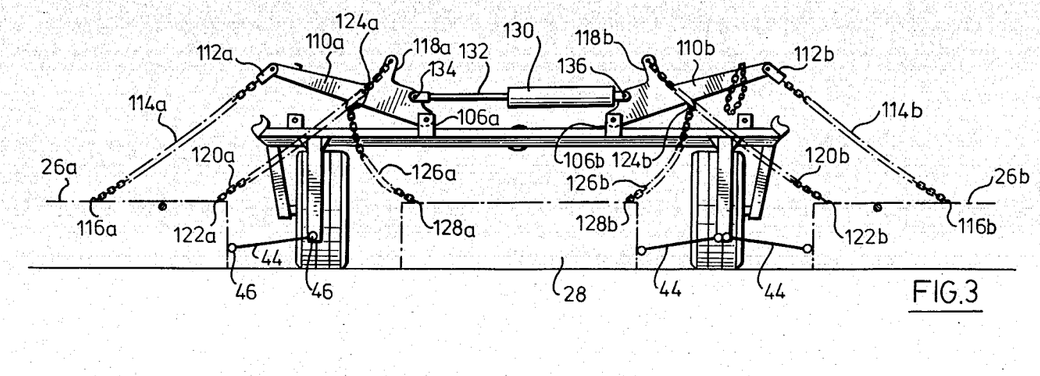
FIG. 3 is a rear view showing the rear-centre and rear-side mowers in lowered position and showing their lifting mechanism.

Fixed to the rear end of the actuating shaft 104a is a rear lifting arm 110a. Pivotally connected to the free tip of arm 110a is a link 112a, to which is connected a chain 114a. As shown in FIG. 3, the chain 114a extends to and is connected to an eye 116a fixed to the rear-side mower 26a slightly outwardly of the centre of the mower 26a.

The rear lifting arm 110a further includes an inwardly extending finger 118a located just below the centre of arm 110a. A chain 120a connected to the tip of finger 118a and (FIG. 3) extends to and is connected to an eye 122a at the inner end of the top of the mower 26a. The chains 114a, 120a serve to lift the outer-side mower 26a, as will be described.

The rear-lifting arm 110a further includes a short outwardly extending projection 124a (FIG. 2) located just above the finger 118a. A lifting chain 126a is connected between the projection 124a and an eye 128a at the top left end of the rear-centre mower 28. The chains 126a, 126b serve to lift the rear-center mower, as will be explained.

The rear lifting arms 110a, 110b are connected together by a hydraulic piston and cylinder 130. The piston rod 132 is pivotally connected at 134 to the inner side of the lifting arm 110a, a short distance below the finger 118a. The butt end of the cylinder 130 is pivotally connected at 136 to a corresponding location on rear lifting arm 110b. Extension and retraction of the piston within the cylinder 130 thus rotates the actuating shaft 104a in one direction and the shaft 104b in the opposite direction, as will be described. To ensure that the shafts 104a, 104b rotate through equal distances (although in opposite directions) at the same time, an equalizing link 138 is provided. One end of link 138 is pivotally connected at 140a to a crank 142a fixed to the shaft 104a. The other end of the link 138 is pivotally connected at 140b to a second crank 142b fixed to shaft 104b. In the position of the mechanism shown in FIG. 2, the actuating shaft 104a has been rotated clockwise to its extreme limit and the actuating shaft 104b has been rotated counter-clockwise to its extreme limit.

If the shaft 104a is now rotated counter-clockwise, it will be seen that the link 138 will cause the shaft 104b to rotate an equal distance clockwise. This ensures that the piston and cylinder 130 will not first begin to lift the mowers on one side of the gang mower 10 and then the mower units on the other side, resulting in an alternating jerky movement upward of the mower units.

Figure 6:
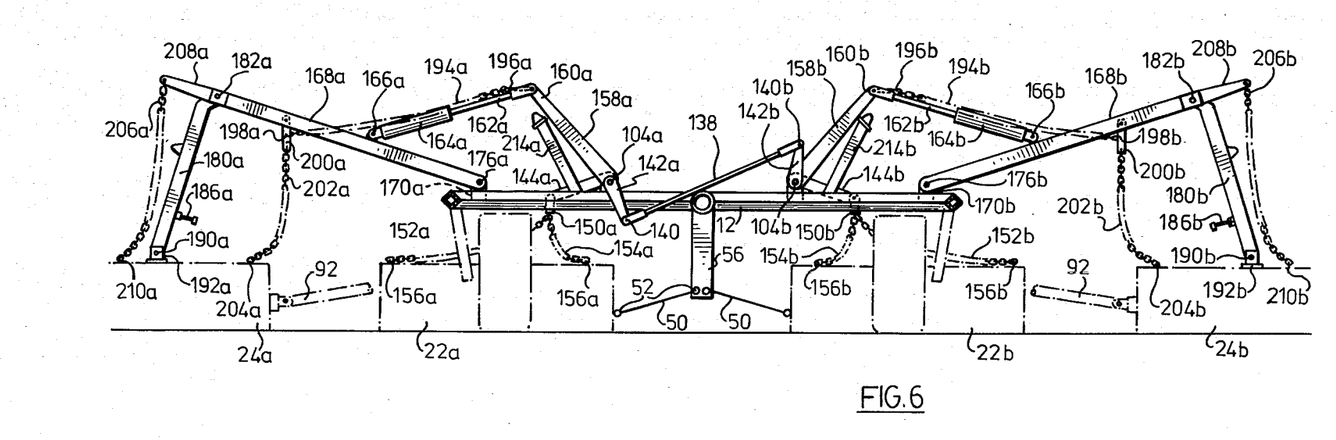
FIG. 6 is a rear view corresponding in position to that of FIG. 3 and showing the outer-side mowers and the front mower in lowered position and also showing their lifting mechanism.

Fixed to the front end of the actuating shaft 104a is a front-lifting arm 144a. The front-lifting arm 144a includes a centre portion 146a which (FIG. 2) slants forwardly and upwardly, so that the tip 148a of the front-lifting arm 144a is located laterally opposite the end of its associated front mower 22a. As shown in FIGS. 2 and 6, a link 150a is pivotally connected to the tip 148a of the front-lifting arm 144a. From the link 150a a pair of chains 152a, 154a extend downwardly and are connected to eyes 156a one on the top surface adjacent each end of the front mower 22a. Thus as the front-lifting arm 144a rotates clockwise from the FIG. 6 to the FIG. 2 position, the front mower 22a will be lifted, as will be described.

The outer-side mower 24a is lifted by a mechanism which includes a centre lifting arm 158a fixed to the shaft 104a immediately rearwardly of the front lifting arm 144a. The tip 160a of the centre lifting arm 158a is pivotally connected to the rod 162a of a shock absorber, the cylinder of which is indicated at 164a. The butt end of the shock absorber cylinder 164a is pivotally connected at 166a to the lower portion of an elongated first support leg 168a.

The first support leg 168a is pivotally connected at its lower end to an upstanding stub support 170a at the front upper edge of the main frame 12. A strut 172a is fixed to the said portion of leg 168a and extends downwardly and rearwardly to another stub support 174a aligned rearwardly of stub support 170a. A shaft 176a extends between first support leg 168a and strut 172a and is welded to both, to increase the rigidity of the structure. The shaft 176a, which is parallel with shaft 104a, extends beyond leg 168a and strut 172a and is rotatably journalled in bushings 178a in the stub supports 170a, 174a.

A secondary leg 180a is pivotally connected at 182a to the end of the first leg 168a. The pivoted end of the secondary leg 180a is L-shaped, as shown at 184a, so that the secondary leg 180a can overly the first leg 168a. The secondary leg 180 is however held off the first leg 168a by a rubber-tipped standoff 186a fixed to the inner surface of the secondary leg 180a.

The second leg 180a terminates in a forked tip 188a. A shaft (not shown) passes through the forked tip 188a and is pivotally journalled in bushings 190a of a mounting structure 192 fixed to the top of the outer-side mower 24a. The mounting structure 192 is located at the centre of mower 24a but the inner end of this mower will nevertheless tend to move downwardly when mower 24a is lifted by secondary arm 180a, because of the weight of shaft extension 92 and universal joint 96. The combination of the first and secondary legs 168a, 180a with the tie rod 82 (FIG. 1) provides firm support and guidance to the outer-side mower 24a when it is in cutting position.

The lifting mechanism for the outer side-mower 24a includes a set of chains to assist and guide the lifting action. The chains, best shown in FIG. 6, include a first chain 194a connected to a link 196a which is pivotally connected to the tip of centre lifting arm 158a. The chain 194a extends to and is connected to the centre point 198a of a link 200a pivotally connected to the front surface of the first leg 168a, near the secondary leg end thereof. A second chain 202a is connected between the tip of the link 200a and an eye 204a on the inner top surface of the outer-side mower 24a (FIG. 6). A third chain 206a is connected to an extension 208a at the tip of the first leg 168a and extends to an eye 210a on the top surface of the outer-side mower 24a. The eye 210a is located slightly outwardly of the mounting structure 192a.

The operation of the structure described is as follows. Assume that the mower units are all lowered and in their operating positions, as shown in FIG. 3 (which shows the three rear mowers 26a, 26b, 28) and in FIG. 6 (which shows the corresponding positions of two outer-side mowers 24a, 24b) and the two front mowers 22a, 22b). Assume that the operator now actuates a tractor control (not shown) to supply hydraulic fluid to the rod end of cylinder 130, to retract the piston rod 132. Actuating shafts 104a, 104b now rotate clockwise and counter-clockwise respectively.

Figure 7:
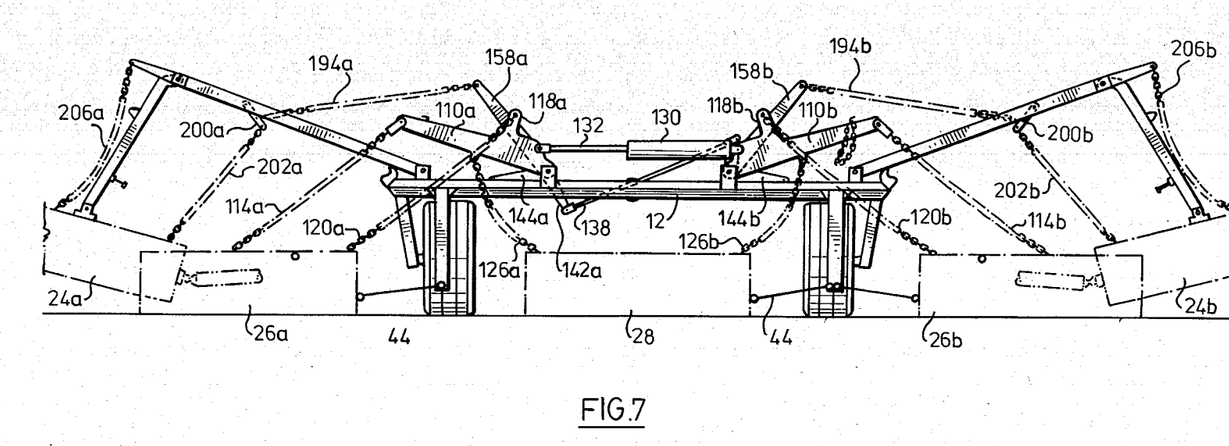
FIG. 7 is a rear view showing the rear mowers and also showing the outer-side mower units partially lifted, to a position in which the remaining mowers all remain lowered.

The first mowers to be lifted are the outer-side mowers 24a, 24b. As the centre lifting arms 158a, 158b rotate toward each other, they exert force through the extended shock absorbers 164a, 164b to begin lifting the first and second legs 168a, 180a. This condition of the gang mower, in which the outer-side mowers 24a, 24b have been lifted a short distance, is shown in FIG. 7. In the FIG. 7 condition, it will be seen that chains 194a, 202a and 194b, 202b are taut and have begun to lift the inner ends of the outer-side mowers 24a, 24b simultaneously with the lifting action of the first and second legs, preventing such inner ends from digging into the turf. The use of two chains 194a, 202a and 194b, 202b acting through links 200a and 200b respectively, provides a multiplication effect which quickly removes the slack from the chains 202a, 202b and ensures that the inner ends of the outer-side mowers 24a, 24b are lifted promptly, before they can dig in and cause damage to the fragile turf on which they may be resting. Chains 206a, 206b prevent the outer ends of mowers 24a, 24b from dropping at this time.

As lifting of the outer-side mowers 24a, 24b begins and continues to the position shown in FIG. 7, all the other movers remain in their lowered positions. This is because sufficient slack is provided in the chains connected to the remaining mowers and also because lifting arms 110a, 144a are located outwardly of centre lifting arm 158a, so that none of these chains are pulled taut until the outer-side mowers 24a, 24b reach the FIG. 7 position. Thus, as shown in FIG. 7, all the rear mowers remain lowered, and the front mowers 22a, 22b (not shown in FIG. 7 for clarity) also remain lowered because of the slack in their chains, and because arm 144a (for example) is positioned counter-clockwise of centre lifting arm 158a. It will be appreciated that considerable force is required to raise the outer-side mowers 24a, 24b because of their weight and because of their lateral distance from the main frame 12. However because no other mowers are being lifted while the outer-side mowers 24a, 24b are started upwardly, the entire force of the piston and cylinder 130 can be devoted to lifting the outer-side mower units 24a, 24b.

Figure 4:
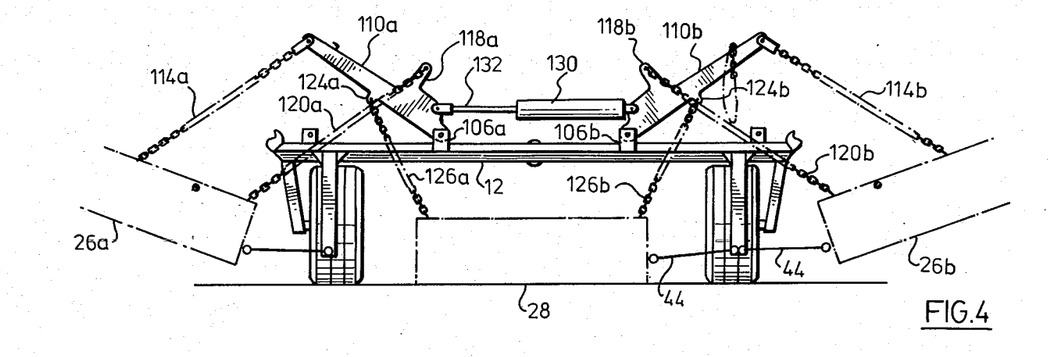
FIG. 4 is rear view similar to FIG. 3 but showing the rear-side mowers partially lifted.
Figure 8:
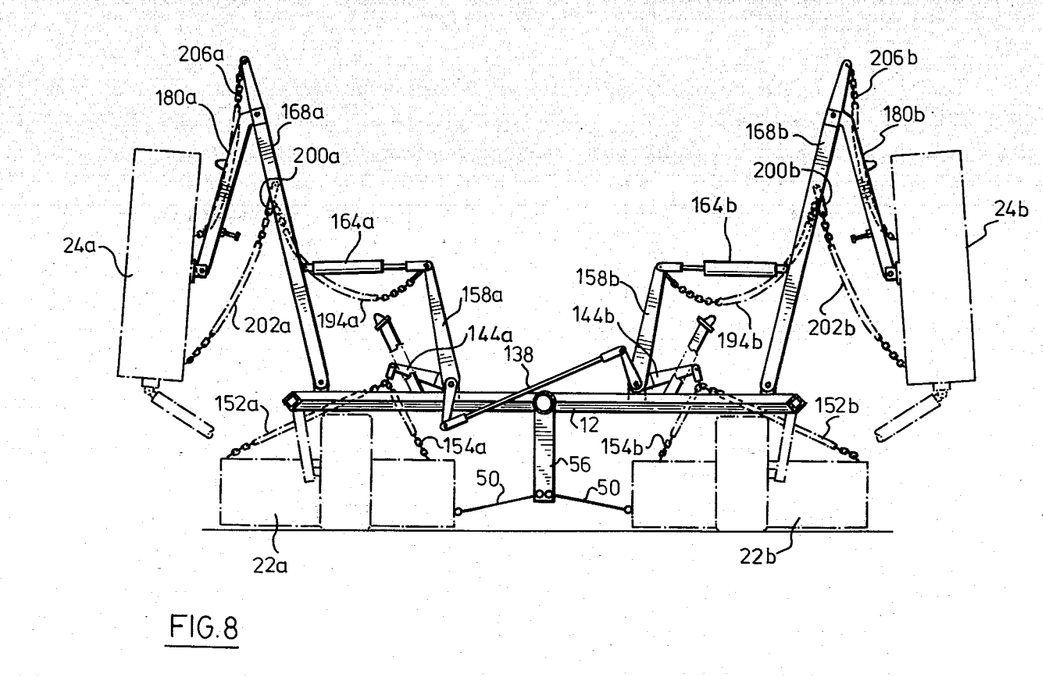
FIG. 8 is a view similar to that of FIG. 6 but corresponding in position to that of FIG. 4, and showing the outer-side mowers more fully lifted and with lifting of the rear-centre mower about to begin and with lifting of the front mowers just begun.

As the outer-side mower units 24a, 24b are lifted past the position shown in FIG. 7, lifting of the rear-side mowers 26a, 26b now begins. FIG. 4 shows the rear-side mowers 26a, 26b partly lifted and FIG. 8 shows the corresponding positions of the outer-side mowers 24a, 24b and of the front mowers 22a, 22b. The rear-side mowers begin to lift at the time when the rear-lifting arms 110a, 110b have rotated toward each other sufficiently to tighten the chains 114a, 120a and 114b, 120b; these chains then begin to pull the rear-side mowers 26a, 26b off the ground. It will be seen from FIG. 4 that as the outer portions of the rear-side mowers 26a, 26b are lifted by chains 114a, 114b, chains 120a, 120b simultaneously lift the inner ends of the rear-side mowers 26a, 26b, preventing these ends from digging into the turf. The projections 124a, 124b help ensure that the chains 120a, 120b clear the main frame 12 of the gang mower at this time.

As shown in FIG. 4, although the rear-side mowers 26a, 26b have been lifted to a substantial extent, the rear-centre mower 28 remains on the ground (although its chains 126a, 126b have been shown tight and it begins now to lift as rear lifting arms 110a, 110b continue to rotate). Similarly, as shown in FIG. 8 which corresponds to FIG. 4, the front mowers 22a, 22b have only just begun to lift as their chains 152a, 154a and 152b, 154b are drawn tight. The slack in the chains 126a, 126b and in chains 152a, 154a and 152b, 154b, which permits substantial initial lifting of the rear-side mowers 26a, 26b while the rear-centre mower 28 and the front mowers 22a, 22b remain lowered, again reduces the load on piston and cylinder 130. This is because the initial heavy load of lifting the rear-side mowers 26a, 26b from a horizontal position occurs after the heavy load of initially raising the outer-side mowers 24a, 24b has occurred but before lifting of the rear-centre and front mowers begins.

As the rear-side mowers 26a, 26b reach the position shown in FIG. 4, the lifting chains 126a, 126b for the rear-centre mower 28 are drawn tight and begin to raise the rear-centre mower 28. Very slightly before the rear-centre mower 28 begins to be lifted, the lifting chains 152a, 154a and 152b, 154b for the front mowers 22a, 22b are drawn tight and begin to lift the front mowers, as shown in FIG. 8. Just before this occurs, the outer-side mowers 24a, 24b have tilted inwardly past their pivot points 98a, 98b and now begin to fall inwardly, this movement being cushioned by the shock absorbers 164a, 164b. Therefore, at the time when lifting of the rear-centre and front mowers begins, no further lifting force is required to lift the outer-side mowers 24a, 24b. In fact, the falling inwardly of the outer-side mowers, transmitted through the shock absorbers 164a, 164b to the centre-lifting arms 158a, 158b, provides a small but not negligible assistance to the piston and cylinder 130 in its lifting action.

Figure 5:
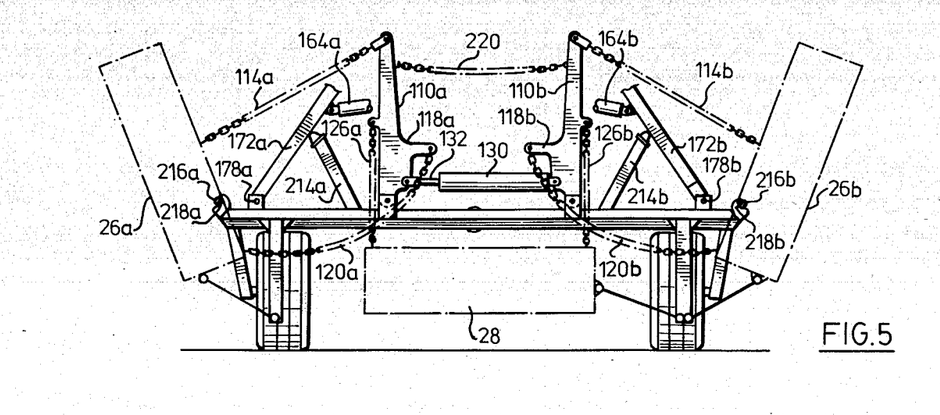
FIG. 5 is a perspective view similar to FIG. 4 but showing the rear-side mowers and the rear-centre mowers fully lifted.
Figure 9:
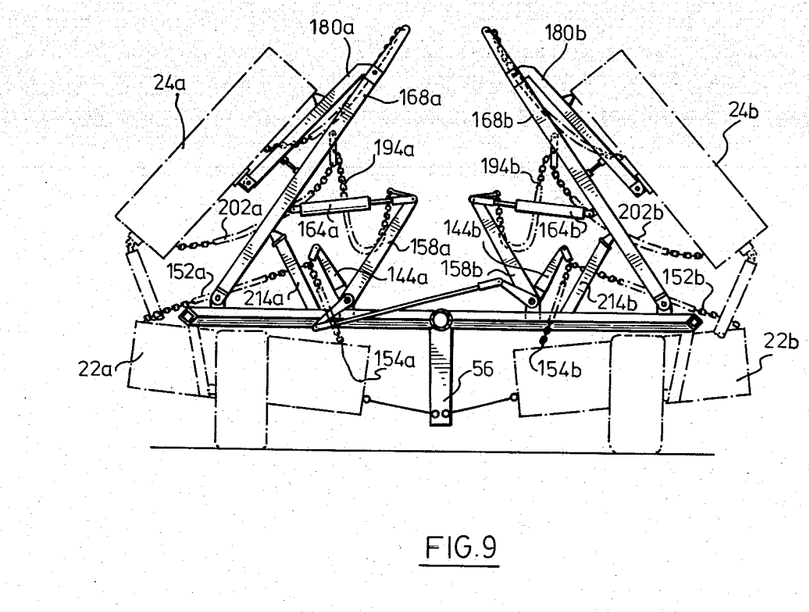
FIG. 9 is a view similar to that of FIG. 8 but corresponding in position to that of FIG. 5 and showing the outer-side and front mowers fully lifted.

As the lifting action continues, the rear-centre mower 28 reaches its upper position shown in FIG. 5, and the front mowers 22a, 22b reach their upper positions shown in FIG. 9 (which corresponds exactly with FIG. 5). It will be seen (FIG. 5) that as the rear-centre mower 28 approaches its upper position, the load imposed on the piston and cylinder 130 in raising it the last increment of height is very small, since the vertical movement of the pivot points 212a, 212b for the chains 126a, 126b becomes minimal as the rear-lifting arms 110a, 110b near their upright positions. The same is true, although not to quite such a substantial extent, for the front mowers 22a, 22b. In addition, as the final raised position is approached, the outer-side mowers 24a, 24b have fallen almost fully inwardly to their positions shown in FIG. 9, in which the first legs 168a, 168b rest on rubber tipped bumpers 214a, 214b extending from the frame 12 (and in which the shock absorbers 164 are compressed). Thus no force is required in respect of these mowers. Therefore as the mowers approach their final raised positions, most of the force of the piston and cylinder 130 is available to pull in the rear-side mowers 24a, 24b to the positions shown in FIG. 5, in which short-stub shafts 216a, 216b welded to the fronts of these mowers are pulled into cups 218a, 218b welded to the main frame 12. For travel the rear-lifting arms may be tied together by a chain 220 (FIG. 5) to ensure that the mowers cannot descend as the gang mower is moved.

When the mowers are to be lowered, the operator actuates a hydraulic control (not shown) on the tractor to extend the piston and cylinder 130. The sequence of operation is now reversed. The rear-side mowers 26a, 26b begin to be lowered, and the rear-centre and front mowers 26a, 26b begin to be lowered, and the rear centre and front mower units 28 and 22a, 22b begin to be lowered at a slowly increasing rate. The piston and cylinder 130 resists the lowering forces exerted by these mowers and at the same time exert force to push the first legs 168a, 168b apart, until the first legs 168a, 168b move outwardly beyond their pivot points 170a, 178a and 170b, 178b. At this time the first legs 168a, 168b begin to fall outwardly, carrying the mowers 24a, 24b with them. The slack when the fall begins is cushioned by the shock absorbers 164, 164b. By this time the rear-centre and front mowers 28 and 22a, 22b are on the ground; the rear-side mowers 26a, 26b are partly lowered, and the outer-side mowers 26a, 26b are then slowly lowered until all the mowers have reached their lowered position.

Figure 10:
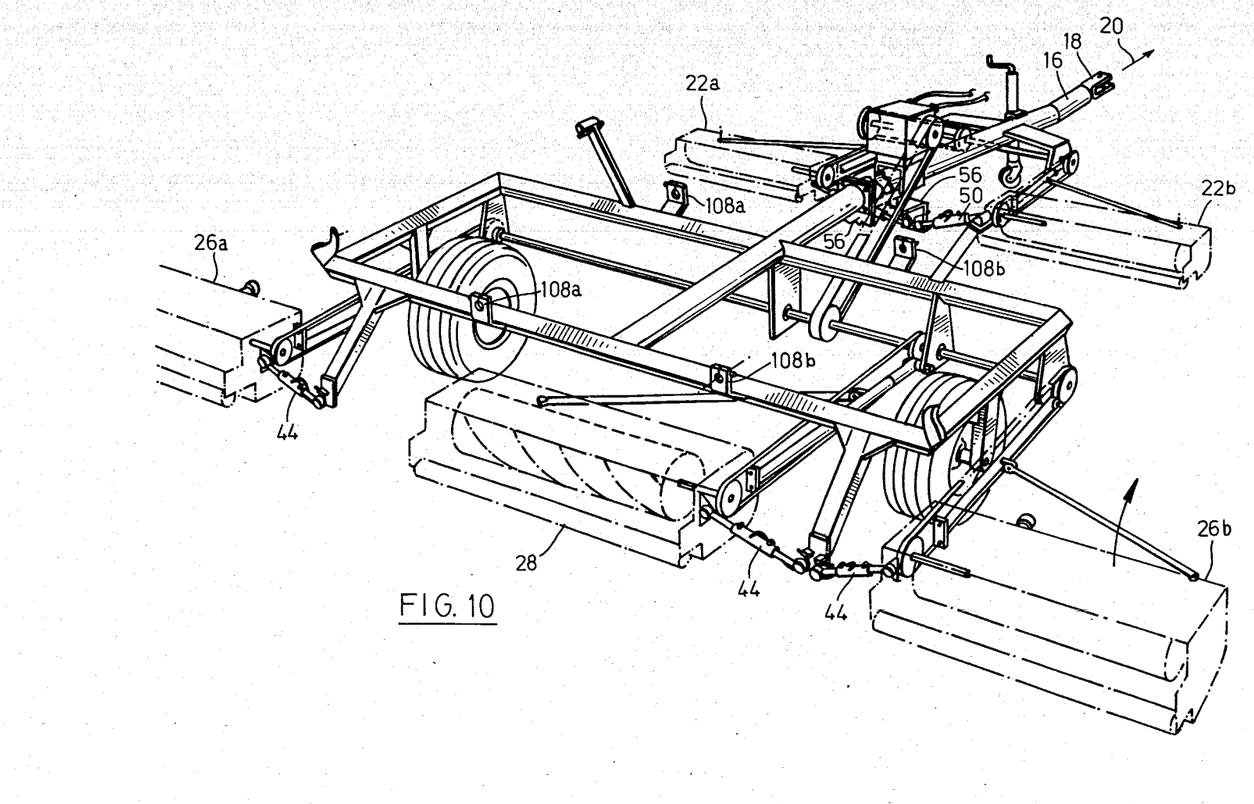
FIG. 10 is a view similar to that of FIG. 1 but showing a gang mower having only five mowers.

If desired, the same system described may be used for a five gang mower, as indicated in FIG. 10. FIG. 10 is the same as FIG. 1, except that the outer-side mower units and their supporting and lifting mechanism have been removed. Exactly the same lifting apparatus as that shown in the previous drawings will be used in the FIG. 10 embodiment, except of course for the support and lifting mechanism used for the outer-side mowers 24a, 24b. The system may also be used for a three gang mower, in which case the rear-side mowers 26a, 26b will also be eliminated.

It will be seen that the chains used for mowers 22a, 22b, 26a, 26b and 28 allow these mowers to "float" up and down during mowing, so that they can follow the contours of the ground. The outer-side mowers 24a, 24b are suspended from legs 168a, 180a and 168b, 180b so that they can be rotated over centre to an inboard angle to reduce the width of the unit for transport. Nevertheless the outer side mowers 24a, 24b must also be able to "float" up and down during mowing. The shock absorbers 164a, 164b permit such floating and yet also absorb the shocks when the mowers fall over-centre inwardly to their folded position and particularly when the mowers fall outwardly as they pass their over-centre position. (Without the shock absorbers, the shocks when the mowers fall outwardly as they pass their over-centre positions may eventually be quite destructive.) During mowing, the leverage of the long legs 168a, 180a and 168b, 180b acting against the shock absorbers provides sufficient force so that the mowers 24a, 24b can "float" as freely as is normally needed for mowing.

It will be appreciated that various changes may be made in the exemplary embodiments described without departing from the spirit of the invention. For example the gang mower may be modified so that it is pushed ahead of a tractor, and the order, number and arrangement of the individual mowers may be varied if desired. In addition, the cylinder 130 may be connected between one of the lifting arms on one side of the frame 12 (e.g. arm 110a) and the frame 12, in which case the lifting mechanism on the other side of the frame 12 is operated by the equalizing link 138.

Further, in some applications (e.g. golf courses) it is desirable to be able to raise some mowers while permitting others to remain lowered, so that the machine can mow through relatively narrow spaces. In that case one cylinder can be used for outer-side mowers 24a, 24b, connected between arms 158a, 158b (or between one of these arms and frame 12), with an equalizing link such as link 138 connected between the pivots of arms 158a, 158b. The other mowers can all be operated together by a single cylinder, as in the FIG. 10 embodiment (but with the lifting arms separately pivoted from those for mowers 24a, 24b and with their own equalizing link), or separate cylinders can be provided for each group of mowers (one for front mowers 22a, 22b and one for rear mowers 26a, 26b and 28), depending on the flexibility needed for the unit. When some mowers are to be lifted while others remain operative, separate drives will be provided so that the lowered mowers will operate while the raised mowers are disconnected from the drive.

I claim:
1. A gang mower having:
   (1) a frame adapted for movement along a path of travel,
   (2) a pair of mowers, one on each side of said frame,

(3) means mounting each mower to said frame for up and down movement of said mower so that said mower may follow the contour of the ground over which it travels, (4) first actuating means mounted on said frame adjacent one side thereof and associated with said mower on said one side and second actuating means on said frame adjacent to the other side thereof and associated with said mower on said other side, (5) each actuating means including lifting arm means rotatable from a lowered to a raised position, (6) connecting means connected between each lifting arm means and its associated mower and dimensioned to raise such mower from a lowered operating position to a raised position when such lifting arm means is rotated from its lowered to a raised position and for permitting said up and down movement of such mower when such mower is in said lowered position, (7) equalizer link means connected between said actuating means for rotation of one lifting arm means in one direction from one of said raised and lowered positions to the other of such positions to cause equal rotation of the other lifting arm means in the opposite direction of rotation from said one of said raised and lowered positions to the other of such positions, (8) and means including a piston and cylinder connected to at least one of said first and second actuating means and operable to rotate said one lifting arm means between said raised and lowered positions and thereby to effect rotation of the other lifting arm means in the opposite direction of rotation between said raised and lowered positions, thus to raise and lower said mowers.

2. A gang mower according to claim 1 wherein said connecting means comprises chain means.

3. A gang mower according to claim 1 wherein said connecting means comprises a linkage having a shock absorber therein.

4. A gang mower according to claim 1 wherein said piston and cylinder is connected between said first and second actuating means.

5. A gang mower according to claim 1 and including a centre mower connected to said frame between said first mentioned mowers to cut grass therebetween, and further connecting means connected between each said lifting arm means and said centre mower and dimensioned to raise said centre mower from a lowered operating position to a raised position when said lifting arm means are rotated from their lowered to their raised position and for permitting up and down movement of said centre mower when the latter is in its lowered position so that said centre mower may follow the contour of the ground over which it travels.

6. A gang mower according to claim 5 wherein said connecting means, said further connecting means and said lifting arm means are dimensioned for lifting of said first mentioned mowers to begin before lifting of said centre mower begins, thereby to reduce the load on said piston and cylinder during lifting of said mowers.

7. A gang mower according to claim 6 wherein said connecting means for said mentioned mowers include two chains for each such mower, one chain connected to the outer portion of each such mower and one chain connected adjacent the inner end of each such mower, the lengths of said chains being such that lifting action of said lifting arm means causes said chains to lift the inner end of each first mentioned mower substantially simultaneously with the lifting of the outer end of each such mower.

8. A gang mower having:
(1) a frame adapted for movement along a path of travel,
(2) a pair of inner mowers, one on each side of said frame,
(3) a pair of outer mowers, one on each side of said frame and adapted to cut grass outwardly of said inner mowers,
(4) a centre mower connected to said frame and positioned to cut grass between said inner mowers,
(5) each said mower being connected to said frame for up and down movement of such mower so that such mower may follow the contour of the ground over which it travels,
(6) first actuating means mounted on said frame adjacent one side thereof and associated with the mowers on said one side of said frame and with said centre mower, and second actuating means mounted on said frame adjacent the other side thereof and associated with the mowers on said other side of said frame and with said centre mower,
(7) each actuating means including lifting arm means rotatable from a lowered to a raised position,
(8) connecting means connected between each lifting arm means and its associated mowers and dimensioned to raise each such mower from a lowered operating position to a raised position when such lifting arm means is rotated from its lowered to its raised position and for permitting said up and down movement of each such mower when such mower is in its lowered position,
(9) equalizer link means connected between said actuating means for rotation of one lifting arm means in one direction from one of said raised and lowered positions to the other of said positions to cause equal rotation of the other lifting arm means in the opposite direction of rotation from said one of said raised and lowered positions to the other of such positions,
(10) and means including a piston and cylinder connected to at least one of said first and second actuating means and operable to rotate said one lifting arm means between said raised and lowered positions and thereby to effect rotation of the other lifting arm means in the opposite direction of rotation between said raised and lowered positions, thus to raise and lower said mowers.

9. A gang mower according to claim 8 wherein said connecting means and said lifting arm means are dimensioned for lifting of one pair of said mowers to begin before lifting of another pair of said mower begins, thereby to reduce the load on said piston and cylinder during lifting of said mowers.

10. A gang mower according to claim 8 wherein said connecting means for said inner and outer mowers include two chains for each such mower, one chain connected to the outer portion of each such mower and one chain connected adjacent the inner end of each such mower unit, the lengths of said chains being such that lifting action of said lifting arm means causes said chains to lift the inner end of each inner and outer mower substantially simultaneously with the lifting of the outer end of each such mower.

11. A gang mower according to claim 9 wherein each said actuating means includes shaft means extending parallel to said path of travel, each shaft means being mounted on said frame for rotation about an axis substantially parallel to said path of travel, said lifting arm means being fixed to said shaft means and said equalizer link means being connected to each said shaft means.

12. A gang mower according to claim 11 wherein said centre mower is located between said outer mowers and wherein each said lifting arm means includes a first lifting arm for its associated outer mower and for said centre mower, and a second lifting arm for its associated inner mower, said first and second lifting arms being spaced apart along said shaft means and said equalizer link means being connected to said shaft means between said first and second lifting arms.

13. A gang mower according to claim 9 including a pair of further outer mowers, one located on each side of said frame and each located outwardly of said outer mower to cut grass outwardly thereof, and further outer mowers being connected to said frame for up and down movement of said further outer mowers so that said further outer mowers may follow the contour of the ground over which they travel, said lifting arm means and connecting means including additional connecting means connected to said further outer mowers for permitting said up and down movement thereof, said lifting arm means and said additional connecting means being dimensioned for movement of said lifting arm means from said lowered to said raised position to lift said further outer mowers from a lowered to a raised position.

14. A gang mower according to claim 13 wherein each said actuating means includes shaft means extending parallel to said path of travel, each shaft means being mounted on said main frame for rotation about an axis substantially parallel to said path of travel, said lifting arm means being fixed to said shaft means and said equalizer link means being connected to each said shaft means.

15. A gang mower according to claim 14 wherein said centre mower is located between said outer mowers and wherein each said lifting arm means includes a first lifting arm for its associated outer mower and for said centre mower, a second lifting arm for its associated inner mower, and a third lifting arm for its associated further outer mower, said equalizer link means being connected to said shaft means.

16. A gang mower according to claim 15 wherein said additional connecting means includes a first leg pivotably mounted on said main frame adjacent each side thereof and pivotable between a raised and a lowered position, a secondary leg pivotally connected to the free end of each said first leg, means connecting the free end of each said secondary leg to a said further outer mower and means connecting each said third lifting arm with its associated said first leg for rotary movement of said third lifting arms to pivot said first legs thereby to raise and lower said further outer mowers.

17. A gang mower according to claim 16 wherein said means connecting said third lifting arm with said first leg comprises a shock absorber for permitting said first leg to fall inwardly towards and outwardly away from said third lifting arm and to cushion the shock of such fall and for permitting said up and down movement of said further outer mowers.

18. A gang mower according to claim 17 wherein said additional connecting means for each said further outer mower includes a link pivotally connected to said first leg, a chain connected from said third lifting arm to the centre of said link, and a further chain connected from the end of said link to the inner end of said further outer mower, said chains being dimensioned to lift the inner end of said further outer mower substantially simultaneously with lifting of the remainder of said further outer mower.

19. A gang mower according to claim 18 wherein said connecting means for said inner and outer mowers include two chains for each such mower, one chain connected to the outer portion of each such mower and one chain connected adjacent the inner end of each such mower unit, the length of said chains being such that lifting action of said lifting arm means causes said chains to lift the inner end of each inner and outer mower substantially simultaneously with the lifting of the outer end of each such mower.

20. A gang mower according to claim 13 wherein said lifting arm means, said connecting means and said additional connecting means are dimensioned for movement of said lifting arm means from said lowered to said raised position to initiate lifting first of said further outer mowers, then of said outer mowers, and then of said inner and centre mowers.

* * * * *